United States Patent [19]

Hoshino et al.

[11] Patent Number: 4,948,772
[45] Date of Patent: Aug. 14, 1990

[54] SUBSTANTIALLY FLAT SURFACED VINYL POLYMER EMULSION PARTICLES HAVING A CONCAVITY AND PROCESS FOR PREPARING THEM

[75] Inventors: Futoshi Hoshino, Tokyo; Makoto Nakano; Takeshi Yanagihara, both of Chigasaki, all of Japan

[73] Assignee: Mitsui Toatsu Chemicals, Incorporated, Tokyo, Japan

[21] Appl. No.: 373,427

[22] Filed: Jun. 30, 1989

[30] Foreign Application Priority Data

Jul. 1, 1988 [JP] Japan .................. 63-162591
Sep. 5, 1988 [JP] Japan .................. 63-221844

[51] Int. Cl.$^5$ .............................................. B41M 5/18
[52] U.S. Cl. .................... 503/207; 427/152; 428/327; 503/200; 503/226
[58] Field of Search ............... 427/152; 503/200, 207, 503/226; 428/327

[56] References Cited

FOREIGN PATENT DOCUMENTS 0176091 10/1984 Japan .................. 503/207

Primary Examiner—Pamela R. Schwartz
Attorney, Agent, or Firm—Millen, White & Zelano

[57] ABSTRACT

Substantially flat surfaced emulsion particles polymerized vinyl monomer, having a concavity in at least one of the flat surfaces, a diameter D of from 0.1 to 5.0 μm, and a particle diameter thickness d ratio (d/D) of 1.2 to 5.0, prepared by the step of (1) aqueous emulsion polymerizing a first vinyl monomer or mixture of monomers (a) to form vinyl polymer seed particles; and (2) aqueous emulsion polymerizing a second vinyl monomer or mixture of monomers (b) in the presence of the vinyl polymer seed particles and a non-aqueous organic solvent having a surface tention to water at 20° C. of 48 dyne/cm or more, in a weight ratio of monomer (a) to monomer (b) of 0.5/99.5 to 50/50; and are useful in high performance recording material, paint compositions and paper coating compositions.

4 Claims, 1 Drawing Sheet

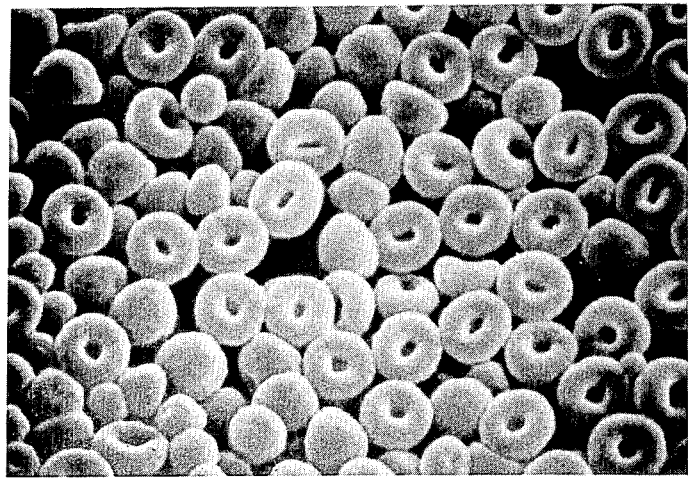
1μ

SUBSTANTIALLY FLAT SURFACED VINYL POLYMER EMULSION PARTICLES HAVING A CONCAVITY AND PROCESS FOR PREPARING THEM

BACKGROUND OF THE INVENTION a. Field of the Invention

The present invention relates to (1) substantially flat surfaced emulsion particles polymerized vinyl monomer having a concavity therein which are useful, for example, as additives in paints and coating agents, such as paper coating agents, and in undercoats of thermal recording materials such as information recording paper and (2) a process for making said particles.

b. Description of the Prior Art:

In recent years, various types of particulate polymers have been investigated as additives to coating agents. Most commonly used are uniform and homogeneous emulsion polymerized polystyrene particles having particle diameters of 0.2 to 0.5 μm. For example, Japanese Laid-Open Patent (TOKKAISHO) 59-59741 discloses a process wherein an unsaturated carboxylic acid and a vinyl monomer are copolymerized in the presence of an anionic surfactant and/or a nonionic surfactant to prepare an emulsion of the copolymer particles 90% or more of which have 0.2 to 0.28 μm particle diameter. The emulsion obtained by this method is shown to be used for paper coating or in paints, etc. Employed as an organic pigment for the above uses, however, the emulsion does not provide sufficient hiding power and brightness and only by using a large amount of the particles is an advantage achieved in practical use.

Microvoid-containing organic emulsion particles were introduced for the purpose of solving these problems. For example, U.S. Pat. No. 3,152,280 discloses a process for preparing an aqueous dispersion comprising (1) adding at least one monoethylenically unsaturated monomer to form a sheath polymer into a dispersion of core polymer particles comprising at least 5% copolymerized unsaturated carboxylic acid, (2) emulsion polymerizing, and (3) neutralizing and swelling the core polymer with an aqueous volatile base to form microvoids. When the particles obtained by this process are employed in organic pigment to paints or paper coating compositions, hiding power and brightness are improved as compared with an organic pigment employing uniform and homogeneous type particles. The microvoids, however, are sometimes damaged on compounding or in use. Microvoids are damaged, for example, by freezing, by certain types of solvents used in paint compositions and by heating. Consequently, microvoid-containing particles have limitations in compounding and application conditions which are often encountered.

Flattened emulsion particles, for example, polyethyle particles flattened by mechanically hot pressing the polymers (Funtai to Kogyo p. 33, 9, 1986), are known. Thus-obtained flat particles, however, usually have a particle diameter of 1 μm or more and a broad size range. Therefore it is difficult to efficiently and correctly produce particles which are suitable for each use.

The problems caused by using emulsion particles especially as an organic pigment are discussed hereinabove. The problems arising from the use of emulsion particles in thermal recording materials are described hereinafter.

A thermal recording material is obtained, for example, by dispersing in a binder a colorless or light-colored leuco form dye as a color former and a phenolic compound like bisphenol A, etc., as a developer, applying the resulting dispersion onto a substrate, e.g., paper, and then drying it. Thus obtained thermal recording materials readily develop a color by the heat of a thermal head and a thermal pen and thus can be used to record a picture. Therefore they are used widely in information equipment such as facsimile and thermal printers, etc., used in data communications and computer terminals. They are also used for labels, tickets, and commuter's tickets.

Because the speed of such recording information equipment has been progressing heat-sensitive materials are desired which can be used in such high speed recording equipment.

One method of increasing recording speed is by raising the thermal head temperature to attain better color production. However, the raised temperature of a thermal head tends to cause problems such as build up of foreign matter, sticking, etc. It also shortens the life of the thermal head, which makes this method of increasing recording speed impractical.

When paper is used as a substrate, direct application of a heat-sensitive color developing layer forming fluid to the paper makes it penetrate into the interior of the paper. Therefore, a smaller amount of the heat-sensitive color producing component is present on the paper surface, which lowers the produced color density. Japanese Laid-Open Patent (TOKKAISHO) 55-86789 discloses a method of making a clear picture with dense color by forming an undercoat containing fine synthetic resin particles between a substrate and a heat-sensitive color producing layer to prevent this penetration into the paper. The sensitivity of recording material obtained by this method, however, is not satisfactory for high speed recording.

OBJECTS OF THE INVENTION

One of the objects of the present invention is to provide substantially flat surfaced emulsion particles having satisfactory properties in gloss, smoothness, hiding power, brightness, etc., when used in coating agents such as paints, paper coating, etc., and at the same time which can be compounded and used with few limitations.

Another object of the present invention is to provide a high performance thermal recording material which can correspond to speeding up of recording in information equipments and give a clear picture in dense color.

Other objects will be apparent to those skilled in the art to which this invention pertains.

SUMMARY OF THE INVENTION

The objects mentioned hereinbefore are achieved by providing substantially flat surfaced vinyl polymer emulsion particles having a concavity in at least one of the flat surfaces, a diameter D of from 0.1 to 5.0 μm, and a particle diameter thickness $\alpha$ ratio (D/d) of 1.2 to 5.0; a process of preparing the substantially flat surfaced vinyl polymer particles, which preferably comprises the step of (1) aqueous emulsion polymerizing to form vinyl polymer seed particles and (2) aqueous emulsion polymerizing in the presence of the vinyl polymer seed particles and non-aqueous organic solvent having a surface tension to water at 20° C. of 48 dyne/cm or more; and; a thermal recording material comprising a substrate a color developing layer containing a color former and a developer which becomes colored upon contact with the color former, and an undercoat between the substrate and the color developing layer which contains substantially flat surfaced vinyl polymer emulsion particles having a concavity in at least one of the flat surfaces of the particles.

BRIEF DESCRIPTION OF THE DRAWING

FIG. 1 is a scanning electron micrograph (X20,000) showing the structures of the substantially flat surfaced emulsion particles having a concavity in the flat surface obtained by the procedure of Example 1.

DESCRIPTION OF THE PREFERRED EMBODIMENTS

The emulsion particles of the present invention having the specific shape described above can be obtained, for example, by (1) forming vinyl polymer seed particles, preferably aqueous emulsion polymerizing a vinyl monomer (a), and then (2) aqueous emulsion polymerizing a vinyl monomer (b) which is the same as or different composition from the monomer (a) in the presence of the vinyl polymer seed particles and a non-aqueous organic solvent. Alternatively, isolated vinyl polymer seed particles can be used. Monomer (b) may be substantially polymerized on the surface and/or inside of the seed particles.

Examples of vinyl monomers (a) are those lacking a functional-group, include aromatic vinyl compounds, such as styrene, α-methylstyrene and vinyltoluene; acrylates, such as methyl acrylate, ethyl acrylate and butyl acrylate; methacrylates, such as methyl methacrylate, ethyl methacrylate and butyl methacrylate; vinyl esters, such as vinyl acetate and vinyl propionate; vinyl cyanides, such as acrylonitrile and methacrylonitrile; and halogenated vinyl compounds, such as vinyl chloride and vinylidene chloride. In order to increase the stability of the emulsion, functional monomers can be used along with the above mentioned monomers, examples of which include unsaturated carboxylic acids, such as acrylic acid, methacrylic acid, crotonic acid and itaconic acid; unsaturated sulfonates, such as sodium styrenesulfonate; acrylates, such as 2-hydroxyethyl acrylate, glycidyl acrylate; methacrylates such as 2-hydroxyethyl methacrylate, glycidyl methacrylate; and acrylamide; methacrylamide; N-methylol acrylamide; N-methylol methacrylamide; and the like.

Crosslinking vinyl monomers can also be used, if desired. Examples of such crosslinking vinyl monomers include monomers having two or more polymerizable unsaturated bonds in one molecule, e.g., divinylbenzene, ethyleneglycol dimethacrylate, diacrylate and trimethylolpropane trimethacrylate. The ratio of crosslinking vinyl monomer to non-crosslinking monomer is preferably 10 weight % or less, more preferably 5 weight % or less.

Although only one of these vinyl monomers can be used as monomer (a), it is preferable to use two or more thereof. In polymerizing to produce the seed particles, a chain transfer agent may be added as a molecular weight modifiers, e.g., for example, a mercaptan, such as t-dodecylmercaptan, or a halogenated hydrocarbon, such as tetrachlorocarbon, in an amount of 0.05 to 5.0 weight %, more preferably 0.4 to 3.0 weight %, based on the monomer weight.

A seed particle emulsion is prepared by the usual emulsion polymerization techniques. Surfactants which can be used either alone or in combination include anionic surfactants, such as sodium alkylbenzenesulfonate, sodium alkylsulfate, sodium dialkylsulfosuccinate and naphthalenesulfonic acid-formalin condensate; and nonionic surfactants, such as polyoxyethylene alkyl ether, polyoxyethylene alkylphenol ether, ethylene oxidepropylene oxide block copolymer and sorbitan aliphatic acid esters. The amount of surfactant employed, which is not particularly critical, usually is 0.1 to 10 weight % based on the total monomer weight. In emulsion polymerization monomer (a), although a non-aqueous organic solvent can be used, it preferably is not used.

Polymerization initiators which are used in conventional emulsion polymerization are also used. Examples include persulfates such as potassium persulfate, sodium persulfate and ammonium persulfate; organic peroxides, such as benzoyl hydroperoxide; and azo compounds, such as azobisisobutyronitrile; and the like. If necessary, the initiator may be used as a redox type initiator in combination with a reducing agent.

To prepare the seed particle emulsion, a monomer (a) of each type is added at once, by portions, or dropwise continuously and then polymerized in the presence of the above described surfactants and initators. The polymerization is preferably carried out at 20° to 90° C. under an inert, e.g., nitrogen atmosphere. To the emulsion containing the vinyl polymer seed particles, a vinyl monomer (b) having the same as or different composition from the monomer (a) is added at all at once, in portions or as a continuous stream. An organic solvent as described herein is added as a mixture with the vinyl monomer (b) or alone prior to adding monomer (b). The polymerization is carried out in a weight ratio of monomer (a) to monomer (b) in the range of 0.5/99.5 to 50/50. Substantially flat surfaced emulsion particles having a concavity in at least one of the flat surfaces are not be obtained outside thus range. Preferably, the weight ratio is 0.5/99.5 to 40/60, more preferably 0.5/99.5 to 30/70.

Examples of a vinyl monomer (b) include aromatic vinyl compounds, such as styrene, α-methylstyrene and vinyltoluene; acrylates, such as methyl acrylate, ethyl acrylate and butyl acrylate: methacrylates, such as methyl methacrylate, ethyl methacrylate and butyl methacrylate; vinyl esters, such as vinyl acetate and vinyl propionate; vinyl cyanides, such as acrylonitrile and methacrylonitrile; and halogenated vinyl compounds, such as vinyl chloride and vinylidene chloride and the like. In addition to these monomers, functional group-containing vinyl monomers can also be used, examples of which include unsaturated carboxylic acids, such as acrylic acid, methacrylic acid, crotonic acid and itaconic acid; unsaturated sulfonates, such as sodium styrenesulfate; acrylates, such as 2-hydroxyethyl acrylate and glycidyl acrylate; methacrylates, such as 2-hydroxyethyl methacrylate and glycidyl methacrylate; and acrylamide;methacrylamide; N-methylolacrylamide; N-methylolmethacrylamide; and the like, and in this case stability is imparted to the emulsion. The ratio of functional monomer to non-functional monomer is preferably 20 weight % or less, more preferably 10 weight % or less. The use of functional monomer in an amount of more than 20 weight % tends to yield new particles and to lower the water resistance of the coating agents and the like.

Crosslinking monomers can also be used, if desired. Such crosslinking monomers are those copolymerizable with the non-crosslinking monomers mentioned hereinabove and monomers with two or more polymerizable unsaturated bonds in one molecule, such as divinylbenzene, ethyleneglycol diacrylate, ethyleneglycol dimethacrylate and trimethylolpropane trimethacrylate. The ratio of crosslinking monomer to the non-crosslinking monomer or monomers is preferably 20 weight % or less, more preferably 10 weight % or less. Although employing a crosslinking monomer improves blocking resistance, heat resistance and solvent resistance, employing an amount thereof, in an amount of more than 20 weight % of monomer (b) prevents smooth polymerization and tends to yield a large amount of coagulum.

The term vinyl monomer (b) includes all the monomers described hereinbefore, and any combination thereof, but preferably produces a polymer having glass transition temperature of 50° C. or more, more preferably 70° C. or more. With a glass transition temperature of less than 50° C., the porosity of the coated layer is damaged by pressure and by the heat on drying in application, which sometimes fails to give highly sensitive color producing thermal recording material. For such products, styrene and methylmethacrylate, either alone or together, are preferred. As well as in the production of seed particles, a chain transfer agent mentioned hereinbefore may be added as molecular weight modifier.

An organic solvent present during the polymerization of monomer (b) should have a surface tension to water at 20° C. of 48 dyne/cm or more, preferably 50 dyne/cm or more so that at least one solvent is selected from halogenated or non-halogenated aliphatic hydrocarbons such as n-pentane, n-hexane, n-heptane, i-octane, n-octane, n-decane and 1-chlorodecane. When an organic solvent having a surface tension of less than 48 dyne/cm is added, spherical particles tend to yield rather than substantially flat surfaced particles having a concavity. An organic solvent thus selected is added on polymerization, preferably in an amount of 1 to 50 weight %, more preferably 5 to 20 weight % based on the total weight of the seed particles and the vinyl monomer (b) containing a cross-linking monomer added if necessary. The addition of less than 1 weight % of the organic solvent tends to yield spherical particles. On the other hand, the addition in an amount of more than 50 weight % prevents the proceeding of polymerization.

The diameter D of the flat surfaces of the particles thus obtained is 0.1 to 5.0 μm, preferably 0.2 to 3.0 μm, more preferably 0.3 to 1.0 μm and the ratio of D to the thickness d of the particle, (D/d), is in the range of 1.2 to 5.0 preferably 1.2 to 4.0 more preferably 1.5 to 3.0. D and (D/d) depend on the particle diameter of the seed particles consisting of a copolymer (a) and the ratio by weight of copolymer (a) to copolymer (b). For example, increasing the weight of copolymer (b) against copolymer (a) brings about a larger D and a larger (D/d).

Polymer particles of less than 0.1 μm diameter when used in a coating composition usually give insufficient hiding power and brightness, and when used in a heat-sensitive material ordinarily fail to attain highly sensitive color-producing ability due to insufficient porosity of the coated layer containing them. On the other hand, particles of more than 5.0 μm diameter are less stable and hard to produce.

During the process of removing the organic solvent from the emulsion particles thus obtained, the flat surfaced emulsion particles having a concavity of the present invention are formed. The organic solvent can be removed with the water by drying the emulsion but is also easily removed by steam distillation leaving the polymer emulsion unaffected.

The concavity in the flat surface of the particles apparently is formed as result the removal of organic solvent present locally within the particles.

There are the case that the organic solvent is removed in the emulsion to form the shape of flat surface and concavity; and the case that the organic solvent is removed in the step of use, e.g. when a coating agent containing the emulsion are coated and dried, at that time the shape of the flat surface and concavity is formed. The concavity of the particle preferably has a depth of about 0.02-2.5 μm, more preferably 0.05-1.0 μm. The diameter of the concavity is preferably about 0.02-4.0 μm, more preferably 0.05-2.0 μm.

When a coating composition containing the flat emulsion particles having a concavity is formed into a coating on a substrate, the flat surface of the particle tends to turn up. Consequently, the coating film shows good smoothness, gloss, particularly binding power and brightness, in the case the concavity is relatively shallow compared to the diameter of the concavity. The particles have few limitations with respect to compounding or in use and are usably stable. For such uses, part or all of titanium dioxide, kaolin clay, and calcium carbonate, ordinary present in vinyl polymer coating compositions, can be eliminated. Coatings formed therefrom exhibit improvements in weight-saving, hardness, abrasion resistance, heat resistance, etc. and can be applied, as an additive in various types of coating compositions to paper, metal, alkaline substrate, plastics, fibers, cloths, and the like.

When the emulsion particles are used as an additive in an undercoat of a thermal recording material, it is believed that the concavities of the particles perform the function of porosity i.e. preventing the thermal energy from a thermal head from being transmitted to the substrate improves color producing sensitivity by concentrating the thermal energy in the color developing layer. When, on the other hand, ordinary spherical particles are used, sufficient density in color can not be attained.

A thermal recording material of the present invention can, for example, be prepared forming an undercoat on a substrate by applying thereto and then drying a mixture of an organic high polymer binder and the flat surfaced particles having a concavity.

Paper, plastic sheets, etc., usually paper can be used as a substrate.

Examples of an organic high polymer which can be used as a binder include water-soluble polymers such as polyvinyl alcohol, oxidized starch, hydroxyethyl cellulose, etc.; emulsion latexes such as styrenebutadiene latex, acrylic emulsion, etc; and the like.

The substantially flat surfaced emulsion particles having a concavity are used in an amount of 10 to 60 parts by dry weight based on the binder weight. An inorganic pigment, if necessary, can be used such as calcium carbonate, magnesium carbonate, talc, kaolin, etc.

The thickness of undercoat is usually 5 to 15 μm.

Examples of color former which can be used in a thermal recording layer applied onto the undercoat are basic colorless dyes such as fluoran type colorless dyes, triallylmethane type dyes, phenothiazine type dyes, etc. Examples of developers which can be used include phenolic compounds, aromatic carboxylic acids, etc. The weight ratio of color former to developer in a thermal recording layer is usually 1:1 to 1:30. Also 10–50 parts by weight of a binder are usually used per 100 parts of the color former and developer. Examples of an organic high polymer which can be used as a binder in the recording layer include water-soluble high polymers such as polyvinyl alcohol, oxidized starch, hydroxyethyl cellulose; or emulsion latexes such as styrenebutadiene latex, acrylic emulsion, etc; and the like.

The color former and the developer used in a thermal recording layer of the present invention are usually separately water ground and dispersed in the presence of a dispersing stabilizer in a ball mill. Thereafter mixed and stirred sufficiently together are the color former, the developer, additionally a binder above mentioned and, if desired, an inorganic pigment such as calcium carbonate, magnesium carbonate, talc, kaolin, etc.; an ultraviolet absorbent such as benzophenon type, triazole type, etc; wax; a sensitizer such as fatty acid amides, etc.; and so on to yield a composition of a thermal recording layer.

The composition of a thermal recording layer is then applied onto the undercoat and then dried to form a dry film of about 2 to about 10 μm thickness.

The thermal recording material of the present invention described in detail hereinbefore provides excellent color density as compared with the heat-sensitive materials employing spherical emulsion particles and those employing inorganic calcium carbonate.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited herein are incorporated herein by reference. Preparation of substantially flat surfaced emulsion
particles having a concavity

EXAMPLE 1

A separable flask equipped with a stirrer, a thermometer, and a reflux condenser was charged with 250 parts of water and 0.1 part of sodium lauryl sulfate, and the contents were then heated to 70° C. with stirring under a nitrogen atmosphere. While keeping the temperature inside the flask at 70°, 1.0 part of potassium persulfate as initiator and 0.05 parts of tert-dodecyl mercaptan as chain transfer agent were added and dissolved, after which a monomer mixture of 10 parts of styrene and 0.3 parts of acrylic acid was charged and allowed to react for 2 hours. After the reaction was complete, added with stirring continously over a period of 4 hours and allowed to react was an emulsion mixture of monomers and an organic solvent prepared by adding 270 parts of styrene, 30 parts of normalbutyl methacrylate, 9.0 parts of acrylic acid, 9.0 parts of divinylbenzene, and 45.0 parts of n-heptane to 200 parts of water and 1.5 parts of sodium lauryl sulfate. After the addition, ageing was effected for additional 3 hours.

The obtained emulsion had a non-volatile content of about 40%, a pH of 1.7, and a viscosity of 40 cps (BM type viscometer, No. 1 rotor, 60 rpm, 25° C.). The particles, measured by an electron microscope, were concavity-having flat particles of a flat surface diameter D of 0.5 μm, a particle thickness d of 0.2 μm, and (D/d) of 2.5, as is shown in FIG. 1.

EXAMPLES 2–7

Flat surfaced emulsion particles having a concavity were obtained by polymerizing by the procedure of example 1 the compositions shown in Table 1, wherein the type and amount of an organic solvent, the ratio by weight of monomer (a)/monomer (b), and monomer composition were varied.

Comparative Example 1

Seed particles were prepared by polymerizing the same vinyl monomer composition employed in Example 1, subsequently a monomer emulsion of the same composition as in Example 1 except lacking the organic solvent was added in the same manner, and then polymerization was carried out.

The obtained emulsion had a non-volatile content of about 42% a viscosity of 15 cps, a pH of 1.8. The particles were spherical particles of an average size of 0.4 μm, not flat particles having concavities as seen in Example 1.

Comparative Examples 2–3

In Comparative Example 2 polymerization was carried out in the same composition and manner as in Example 1 except that toluene having a surface tension to water at 20° C. of 35.7 dyne/cm was substituted for the organic solvent added. In Comparative Example 3, the polymerization of Example 1 was completed without adding the organic solvent, which was added after the polymerization and then stirred at 70° C. for 2 hours. The results are shown in Table 1.
Preparation of thermal recording materials
Examples 8–12, Comparative Examples 4–7
(i) Preparation of undercoat compositions Undercoat compositions of thermal recording material were prepared by blending and stirring well a mixture with the compositions as below using an emulsion given in Table 2.

| Ingredient | Solid content | Parts by weight |
|---|---|---|
| Fine particle emulsion | 40% | 25 |
| Bonron S-1120 (an acrylic emulsion manufactured by Mitsui-Toatsu Chemicals Co.) | 45% | 70 |
| Carbital 90 (a calcium carbonate dispersion manufactured by Japan IPC Co.) | 73% | 5 |

(ii) Preparation of color developing layer composition

Fluid A (color former dispersion) and fluid B (developer dispersion) with the compositions as below were dispersed in a sand mill separately to make the compositions.

| Ingredient | Parts by weight |
|---|---|
| (Fluid A) | |
| 3-Diethylamino-6-methyl-7-anilino-fluoran | 20 |
| 20% aqueous solution of hydroxyethyl cellulose | 5 |
| Water | 75 |

| Ingredient | Parts by weight |
| --- | --- |
| (Fluid B) | |
| Bisphenol A | 20 |
| 20% aqueous solution of hydroxyethyl cellulose | 5 |
| Petrolite R-50 (a microcrystalline wax manufactured by Halico) | 5 |
| Water | 70 |

After sufficient dispersion in a sand mill, 15 parts by weight of fluid A, 40 parts by weight of fluid B, 20 parts by weight of calcium carbonate, and 25 parts by weight of 20% polyvinyl alcohol solution (K-117 supplied by Kuraray) were mixed and stirred well to give a composition of color developing layer.

(iii) Preparation of thermal recording materials

Onto commercial wood free paper (basis weight of about 50 g/m²), the above undercoat compositions were applied using a bar coater in an amount of 15 g/m² dry coating weight and then dried. Subsequently the color developing layer composition was applied by a bar coater in an amount of 15 g/m² dry coating weight and then dried to result in a thermal recording material. Color developing on printing was effected with a thermal facsimile (COPIX 6500 made by Toshiba Corporation), the density was measured by a Macbeth density meter. The results are given in Table 2.

Application 1 Application to paints

Concavity-having flat particles of Examples 1–7 and spherical particles of Comparative Examples 1–3 were used in paint compositions as an organic pigment replacing part of rutile titanium dioxide. As a paint vehicle Almatex E-208, an acrylic emulsion of 45% solid resin was used. The paint composition is given in Table 3.

| Ingredient | Parts |
| --- | --- |
| 25% aqueous solution of Tamol 731 (a dispersant manufactured by Rohm and Haas Co.) | 12.2 |
| Ethylene glycol | 40.0 |
| 2-Amino-2-methylpropanol | 3.0 |
| Nopco DF-122NS (an anti-foaming agent manufactured by Sun Nopco Co.) | 0.8 |
| Rutile titanium dioxide | 164.5 |
| Prepared particle emulsion (40%) | 102.8 |
| Almatex E-208 (an acrylic emulsion: manufactured by Mitsui-Toatsu Chemicals Co.) | 676.0 |
| Butyl cellosolve/Texanol (½) solvent mixture | 40.0 |
| Hydroxyethyl cellulose/propylene glycol (1/10) mixture | 12.4 |
| of the pigment in solids content | 40.0% |
| Paint viscosity | 70–80 KU |

The paints were prepared by (1) dispersing sufficiently water, Tamal 731, ethylene glycol, 2-amino-2-methylpropanol, Nopco DF-122NS, and rutile titanium dioxide in a pigment dispersion mixer, (2) subsequently adding the emulsion prepared in the Examples and the Comparative Examples, Almatex E-208, butylcellosorb/Texanol, and hydroxyethyl cellulose/propyrene glycol with stirring, and (3) adjusting the viscosity to 70 - 80 KU by a Stomer viscometer.

The obtained paints were applied to slate boards to give dry film thicknesses of about 40 μm and performance evaluations were effected after one week drying at room temperature. Evaluation methods are given as follows.

Gloss: Measured at an angle of 60° with a gloss meter (manufactured by Suga Testing Machine Co.).

Hiding power: Evaluated according to JIS K-5663, and calculated from the ratio of a reflactance at 45° to at 0° after one week drying at room temperature using hinding charts made by Japan Test Panel Ind. Co. onto which the paints were applied by an applicator to give dry film thicknesses of 75 μm.

Water resistance: Evaluated with a mark ( ) given to a sample showing no changes such as blistering, loss in gloss, etc after 2 day impregnation in water at 25° C.

Alkali-resistance: Evaluated with a mark ( ) given to a sample showing no changes such as blistering, whitening, etc. after 2 day impregnation in a 2% sodium hydroxide solution saturated with calcium hydroxide.

Weater resistance: Judged to be good ( ) when no abnormalities such as blistering, whitening and loss in gloss are observed after irradiation in a weather meter for 500 hours.

Washability: Evaluated according to JIS K-5663. Judged to be good ( ) when the paint film does not peel off even after being washed more than 2,000 times, and fair (Δ) when the paint film peels off after being washed 1,000–2,000 times.

Adherence: Judged to be good ( ) when the paint film is not stripped at a crosscut, and fair ( A) when the paint film is slightly stripped at a crosscut. The evaluation results are shown in Table 4.

Application 2 Application to paper coating

The emulsions prepared in Examples 1 to 7 and Comparative Examples 1 to 3 were used as an organic pigment or filler in coating colors for paper coating and underwent performance evaluations. The composition and evaluation methods are shown as below.

| Ingredient | Parts |
| --- | --- |
| UW-90 (manufactured by EMC Co.) | 90 |
| Pigment or filler | 10 |
| Aron T-40 (a dispersant manufactured by TOAGOSEI CHEMICAL INDUSTRY) | 0.09 |
| MS-4600 (Manufactured by Nippon Food Industrial Co.) | 3 |
| Polylac 755 (SBR latex: manufactured by Mitsui-Toatsu Chemicals Co.) | 12 |

(The solid content of the coating composition was 62%.)

The coating colors were prepared by (1) adding to water Aron T-40 of 40% solids content as a dispersant, (2) dispersing kaolin clay UW-90 in a Kaules mixer well, to which the emulsions prepared in examples 1 to 7 or Comperative Examples 1 to 3 were added. For comparison, titanium dioxide paste of 62% solids content (supplied by Dainichi Seika K.K.) as an inorganic pigment and light calcium carbonate slurry TP 222HS of 60% solids content (supplied by Okutama Kogyo Ind. Co.) as an inorganic filler were used. Phosphated starch MS-4600 and Polylac 755 of 50% solids content as a binder were added to form coating colors.

The above coating colors were applied onto wood free paper to give dry coating weights of 14 to 15 g/m², dried at 120° C. for 20 seconds, and then calendered twice to yield the coated papers at a calender roll temperature of 60° C., at a linear pressure of 70 kg/cm, and at a speed of 10 m/min. Performance assesments were effected.

Color viscosity: Measured with a BM type viscometer (60 rpm; No. 4 rotor).

Gloss of white paper: 75° reflectance is measured according to JIS P-8142.

Gloss of printed paper: Using an RI printing tester, paper is printed with 0.4 cc of New Bright Indigo (manufactured by Toyo Ink Co.). After drying, its 75° reflectance is measured according to JIS P-8142.

Brightness: Measured with a Hunter brightness meter according to JIS P-8123.

Opacity: Measured according to JIS P-8138.

Dry pick: Tested with an RI printing tester on the basis of 10 points.

Wet pick: Tested with an RI printing tester on the basis of 10 points.

The evaluation results are given in Table 5.

TABLE 2

| | Emulsion Particles | | Print Density |
|---|---|---|---|
| | Preparation Method | Shape of Particle | |
| Example 8 | Ex. 1 | Flat particle having a concavity | 1.22 |
| Example 9 | Ex. 2 | Flat particle having a concavity | 1.24 |
| Example 10 | Ex. 4 | Flat particle having a concavity | 1.25 |
| Example 11 | Ex. 5 | Flat particle having a concavity | 1.18 |
| Example 12 | Ex. 6 | Flat particle having a concavity | 1.21 |
| Comparative Example 4 | Comp. Ex. 1 | Spherical Particles | 1.0 |
| Comparative Example 5 | Comp. Ex. 2 | Spherical Particles | 1.0 |
| Comparative Example 6 | Comp. Ex. 3 | Spherical Particles | 1.0 |
| Comparative Example 7 | | Calcium carbonate only | 0.9 |

TABLE 1

| | Raw Materials | Example | | | | | | | Comparative Example | | |
|---|---|---|---|---|---|---|---|---|---|---|---|
| | | 1 | 2 | 3 | 4 | 5 | 6 | 7 | 1 | 2 | 3* |
| First step polymerization | ST | 10.0 | 5.0 | 5.0 | 2.0 | | 10.0 | | 10.0 | 10.0 | 2.0 |
| | MMA | | | | | 20.0 | | 10.0 | | | |
| | BMA | | | | 0.5 | 10.0 | | | | | 0.5 |
| | AAc | 0.3 | 0.2 | 0.2 | 0.01 | 1.0 | 0.3 | 0.3 | 0.3 | 0.3 | 0.01 |
| | DVB | | | 0.30 | | | 0.1 | | | | |
| | NaLS | 0.1 | 0.05 | 0.05 | 0.01 | 0.2 | 0.1 | 0.05 | 0.1 | 0.1 | 0.01 |
| | tDM | 0.05 | 0.05 | 0.03 | 0.1 | 0.1 | 0.05 | 0.05 | 0.05 | 0.05 | 0.1 |
| Second step polymerization | ST | 270.0 | 320.0 | 300.0 | 320.0 | | | 270.0 | 270.0 | 270.0 | 320.0 |
| | MMA | | | | | 200.0 | 300.0 | | | | |
| | AN | | | 20.0 | | 30.0 | | 30.0 | | | |
| | BMA | 30.0 | | | 30.0 | 50.0 | | | 30.0 | 30.0 | 30.0 |
| | AAc | 9.0 | 6.0 | 6.0 | 2.0 | 10.0 | 15.0 | 15.0 | 9.0 | 9.0 | 2.0 |
| | DVB | 9.0 | 15.0 | 15.0 | 10.0 | | 3.0 | | 9.0 | 9.0 | 10.0 |
| | NaLS | 1.5 | 1.0 | 1.5 | 1.5 | 1.5 | 1.5 | 1.5 | 1.5 | 1.5 | 1.5 |
| | n-He | 45.0 | | 5.0 | | 1.0 | 30.0 | 30.0 | | | |
| | i-Oc | | 60.0 | | | | | 15.0 | | | |
| | n-De | | | 10.0 | 7.50 | 40.0 | | | | | 75.0 |
| | Tolu | | | | | | | | | 45.0 | |
| Non-volatile Content/% | | 40 | 40 | 43 | 41 | 40 | 41 | 40 | 42 | 40 | 41 |
| pH | | 1.7 | 1.6 | 1.7 | 1.7 | 1.8 | 1.6 | 1.7 | 1.8 | 1.7 | 1.7 |
| Viscosity/cps | | 40 | 37 | 21 | 30 | 62 | 38 | 35 | 15 | 18 | 10 |
| Flat Surface Diameter D/μm | | 0.5 | 1.0 | 1.1 | 2.0 | 0.3 | 0.65 | 0.6 | | | |
| Particle Thickness d/μm | | 0.2 | 0.4 | 0.6 | 0.6 | 0.15 | 0.3 | 0.3 | | | |
| (D/d) | | 2.5 | 2.5 | 1.8 | 3.3 | 2.0 | 2.2 | 2.0 | | | |
| Particle Diameter/μm | | | | | | | | | 0.4 | 0.5 | 1.6 |
| Shape of Particle | | Flat | Flat | Flat | Flat | Flat | Flat | Flat | | | |

| Abbreviation | | | | Surface tension to water at 20° C. (dyne/cm$^2$) |
|---|---|---|---|---|
| ST: | Styrene | n-He: | n-Heptane | 50.9 |
| MMA: | Methyl methacrylate | i-Oc: | i-Octane | 51.0 |
| AN: | Acrylonitrile | n-De: | n-Decane | 51.2 |
| BMA: | Normal butyl methacrylate | Tolu: | Toluene | 35.7 |
| AAc: | Acrylic acid | Flat: | Substantially flat surfaced particle having a concavity | |
| DVB: | Divinyl benzen | | | |
| tDM: | t-Dodecyl mercaptan | | | |
| NaLS: | Sodium lauryl sulfate | | | |

*After completion of polymerization, 75 parts of n-decane were added and stirred at 70° C. for 2 hours.

TABLE 4

| Applications | Emulsion Particles | Titanium dioxide/ Emulsion particles (w/w) | a | b | c | d | e | f | g |
|---|---|---|---|---|---|---|---|---|---|
| 1-1 | Ex. 1 | 80/20 | 94 | 95 | | | | | |
| 1-2 | Ex. 2 | " | 93 | 96 | | | | | |
| 1-3 | Ex. 3 | " | 92 | 96 | | | | | |
| 1-4 | Ex. 4 | " | 93 | 95 | | | | | |
| 1-5 | Ex. 5 | " | 92 | 92 | | | Δ | | |
| 1-6 | Ex. 6 | " | 92 | 94 | | Δ | | | |
| 1-7 | Ex. 7 | " | 92 | 93 | | | Δ | | |

TABLE 4-continued

| Applications | Emulsion Particles | Titanium dioxide/ Emulsion particles (w/w) | a | b | c | d | e | f | g |
|---|---|---|---|---|---|---|---|---|---|
| 1-8 | Comp. Ex. 1 | " | 88 | 91 | | | | | |
| 1-9 | Comp. Ex. 2 | " | 88 | 91 | | | Δ | | |
| 1-10 | Comp. Ex. 3 | " | 86 | 89 | | | | | |
| 1-12 | — | 100/0 | 87 | 99 | | | | | | a: Gloss
b: Hiding power
c: Water resistance
d: Alkali-resistance
e: Weather resistance
f: Washability
g: Adherence

TABLE 5

| Applications | Pigments or Fillers | Viscosity (cps) | Gloss of White Paper | Gloss of Printed Paper | Brightness | Opacity | Dry pick | Wet pick |
|---|---|---|---|---|---|---|---|---|
| 2-1 | Ex. 1 | 1440 | 80.1 | 94.1 | 80.1 | 95.0 | 8 | 8 |
| 2-2 | Ex. 2 | 1560 | 79.8 | 94.0 | 80.3 | 95.1 | 8 | 8 |
| 2-3 | Ex. 3 | 1580 | 79.5 | 93.7 | 80.4 | 95.3 | 8 | 8 |
| 2-4 | Ex. 4 | 1780 | 79.2 | 93.9 | 80.6 | 95.6 | 8 | 9 |
| 2-5 | Ex. 5 | 1470 | 80.8 | 94.4 | 79.9 | 94.5 | 8 | 8 |
| 2-6 | Ex. 6 | 1530 | 79.7 | 93.5 | 80.2 | 95.2 | 8 | 8 |
| 2-7 | Ex. 7 | 1610 | 80.2 | 94.2 | 80.1 | 95.3 | 8 | 8 |
| 2-8 | Comp. Ex. 1 | 1310 | 78.5 | 89.8 | 79.4 | 94.2 | 7 | 9 |
| 2-9 | Comp. Ex. 2 | 1200 | 76.7 | 90.2 | 78.8 | 94.1 | 8 | 8 |
| 2-10 | Comp. Ex. 3 | 1150 | 75.4 | 89.9 | 79.3 | 93.9 | 8 | 8 |
| 2-12 | Titanium dioxide | 1820 | 71.3 | 88.7 | 81.9 | 97.1 | 8 | 9 |
| 2-13 | Calcium carbonate | 1220 | 69.8 | 88.3 | 77.5 | 93.9 | 8 | 9 |

We claim:

1. A thermal recording material comprising a substrate, a color developing layer containing a color former and a developer which becomes colored upon contact with the color former, and an undercoat between the substrate and the color developing layer which contains substantially flat surfaced vinyl polymer emulsion particles having a concavity in at least one of the flat surfaces of the particles.

2. The thermal recording material of claim 1, wherein the particles are substantially flat surfaced and have a diameter D of from 0.1 to 5.0 μm, and a particle diameter to thickness d ratio (D/d) of 1.2 to 5.0

3. The thermal recording material of claim 1, wherein the polymer of the vinyl polymer emulsion particles is a polymer of at least one monomer selected from the group consisting of aromatic vinyl monomers, acrylate or methacrylate monomers, vinyl alcohol ester monomers, vinyl cyanides and vinyl halide monomers.

4. The thermal recording material of claim 1, wherein the thickness of the undercoat is 5 to 15 μm.

* * * * *